Feb. 16, 1971   H. NISSER ET AL   3,563,854
SEALING ARRANGEMENT FOR A BREAST BOX OF A PAPERMAKING MACHINE
Filed July 24, 1967
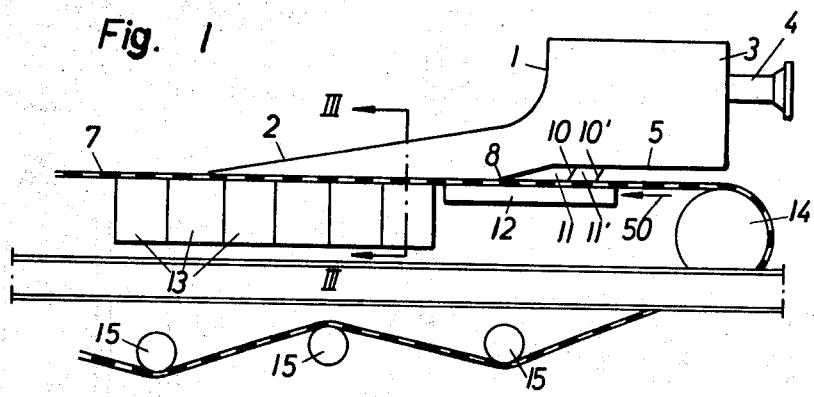
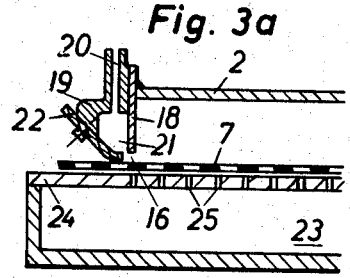
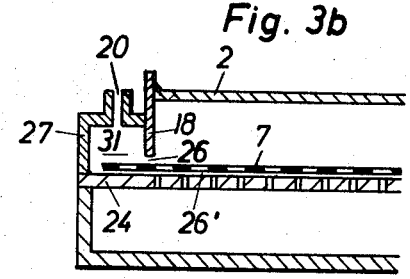
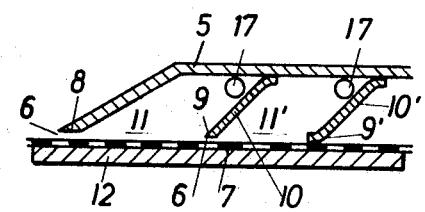
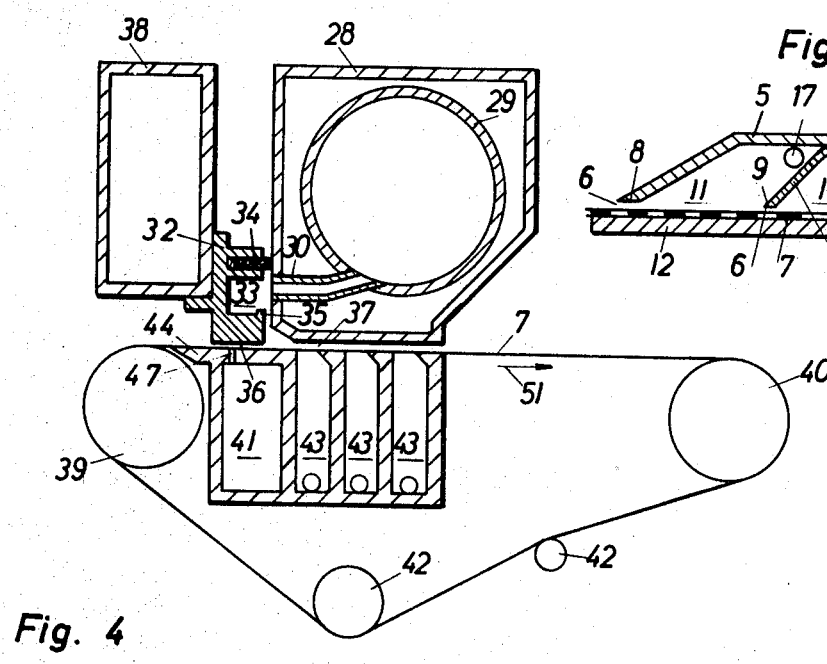
INVENTOR.
HENRIK NISSER
BY WERNER SCHÖN

United States Patent Office 3,563,854
Patented Feb. 16, 1971

3,563,854
SEALING ARRANGEMENT FOR A BREAST BOX OF A PAPERMAKING MACHINE
Henrik Nisser and Werner Schon, Heidenheim, Germany, assignors to J. M. Voith, G.m.b.H., Heidenheim (Brenz), Germany
Filed July 24, 1967, Ser. No. 655,597
Claims priority, application Germany, Aug. 6, 1966, P 15 11 247.7
Int. Cl. D21f 1/58
U.S. Cl. 162—353       5 Claims

ABSTRACT OF THE DISCLOSURE

Sealing arrangement for sealing between the bottom edges of the walls of the breast box of a papermaking machine and the porous member moving therebeneath, in which the walls of the breast box terminate short of the porous member and chambers are formed along the walls to which a fluid medium is supplied under pressure to prevent suspension from flowing from the breast box out through the openings.

CROSS REFERENCE TO RELATED APPLICATION

Applicants claim priority under 35 U.S.C. 119 for German application Ser. No. V31,666, filed Aug. 6, 1966.

The present invention relates to papermaking machines and is particularly concerned with a breast box structure for a papermaking machine, and more particularly still is concerned with a sealing arrangement for the walls of the breast box, where the walls approach the moving wire or other member that receives the suspension flowing out of the breast box.

As is known, breast boxes for papermaking machines serve the purpose of receiving the suspension containing the fibers which make up the paper, and distribute the suspension over a member on which it is received, generally a moving wire such as is employed in a Fourdrinier machine. It is, of course, important for the suspension to be uniformly distributed over the porous member which receives it and for it to be distributed with uniform thickness, and preferably for the suspension to be supplied to the porous member at the same rate of speed at which the porous member is moving.

Breast boxes can take many forms, and the simplest type is merely a box open toward the top and connected with the distributor which delivers the suspension directly to the porous member. Such a box has lateral walls limiting the width of the box, and also has a rear wall where the porous member moves into the range of the distributor and a front wall where the porous member leaves the distributor. The present invention is particularly concerned with sealing of the box where the lateral and rear walls meet tre porous member moving through the distributor and in which regions where the lateral and rear walls meet the porous members have been referred to as gates.

The known type of breast box construction has the zone along the porous member where the suspension is delivered thereto, namely the formation zone, covered by an upper lip or wall member which extends from the box in the direction of movement of the porous member and converges with the porous member. The region along the sides of this lip are also confined by lateral walls. In such an arrangement, the box to which the suspension is delivered may have a solid bottom terminating in a lip near the back end of the aforementioned upper lip, and which lip on the bottom wall must form a seal with the moving porous member.

Heretofore, for sealing along the lateral walls and rear wall of a breakst box arrangement, materials such as felt, rubber or the like have been provided, carried by the walls and pressed against the moving porous member. It will be evident that this arrangement creates wear and friction on the expensive porous member and the sealing members carried by the walls of the box are also subjected to friction with corresponding wear and tear. The friction of said sealing elements on the moveable porous member is most pronounced along the side edges of the porous member and it has happened on occasion that the porous member is even pulled out of shape due to the non-uniform tension exerted thereon.

It is also known to seal the regions where the walls of the breast box meet a movable porous member by the use of spray tubes which direct a curtain of water against the gates along the bottom edges of the said walls. It has been found, however, that a curtain of this nature is never completely continuous and uniform so that, even when this expedient is resorted to, the walls of the breast box are still pressed relatively firmly against the movable porous member and this, as mentioned before, creates friction and wear and tear on the interengaging parts.

The present invention proposes, as a novel solution to the problem outlined above, the provision of a sealing arrangement which is entirely reliable and which will never become plugged or blocked and thus inoperative.

Still further, the present invention proposes such a seal in which the frictional forces and wear and tear are extremely small, or are eliminated entirely.

In general, according to the present invention, chambers are arranged adjacent the gates at the lower edges of the longitudinal and lateral walls of the breast box which it is desired to seal to the moving porous member, and which chambers supply a fluid locking medium to the said gates to prevent the flow of suspension therethrough.

As a blocking medium, water can be employed in the form of fresh water or in the form of back water drained from the suspension of the moving porous member. However, as will be evident in the subsequent description, a gaseous medium such as air could also be employed. The description is directed to the use of liquid and makes reference to water, but it will be understood that the invention comprehends the use of either liquid or gas as a blocking medium.

By employing a fluid sealing medium, the longitudinal and transverse walls of the box to be sealed to the moving porous member do not make direct physical contact with the moving member. Furthermore, it is not necessary to employ solid sealing members, such as strips or felt or rubber-like material, between a wall of the breast box and the moving porous member which would also represent a solid bearing between the walls and the porous member. Rather, according to the present invention, at least a small gate is left open between the walls and the moving member and against the gates, or slits, is directed a blocking medium under a predetermined pressure, which in general, will be equal to the pressure head at the gate or slit inside the breast box. In this manner, the blocking medium prevents the escape of suspension from the breast box while at the same time no frictional forces tending to impose a drag on the moving porous member, or to cause wear thereof, are present.

In certain modifications to be described, there is a sealing member carried by the breast box that bears on the moving porous member but it will be evident, as the following description proceeds, that these members are so arranged that they bear very lightly upon the moving porous member and do not cause wear or frictional forces to be exerted thereon.

If the pressure of the blocking medium supplied to the chambers is somewhat higher than the pressure inside the breast box, the blocking medium will pass through the gates or slits and become mixed with the suspension in the breast box. The pressure of the blocking medium, however, is so regulated that the amount of the blocking medium that seeps into the breast box is so small that the quality of the paper web formed will not be influenced thereby. The advantage exists, when the blocking medium is caused to seep through the gates, that no pulp fibers can ever enter the gates and this is of particular advantage because such fibers could cause the gate to become clogged up, or could agglomerate in the gate or slit and occasionally break off in clumps to the material deterioration of the web being formed. As it has been mentioned that the invention can be employed on the longitudinal and transverse walls of the box which are to be sealed to the moving porous member, it will be evident that the invention could be employed on only one wall if so desired.

In one modification according to the invention, the blocking medium is supplied to the side of the moving porous member facing away from the distributing chamber wherein the pulp suspension is supplied to the porous member. Since the blocking medium is applied to the porous member at the bottom, it is insured that particles of fiber which may adhere to the upper surface of the moving porous member are not pressed into the meshes thereof, but are rather dislodged therefrom so that not only is a seal established between the porous member and a wall of the breast box, but the porous member itself is maintained clean at all times.

In another modification of the present invention, the chambers along the longitudinal walls of the breast box are so arranged that the edge of he moving porous member is received therein. The blocking medium in this case completely surrounds the edge portion of the porous member and a particularly effecitve seal is obtained.

The nature of the present invention and the objectives and advantages thereof will become more apparent upon reference to the following detailed specification taken in connection with the accompanying drawings in which:

FIG. 1 is a somewhat schematic longitudinal section taken through the breast box end of a papermaking machine adapted for the practice of the present invention;

FIG. 2 is a portion of FIG. 1 at the region where the moving porous member enters the breast box, and drawn in enlarged scale;

FIG. 3a is a section indicated by line III—III on FIG. 1, and drawn in somewhat enlarged scale;

FIG. 3b is a view like FIG. 3a, but illustrates a modification; and

FIG. 4 is a sectional view somewhat like FIG. 1, but shows a different type of breast box and a different type of sealing arrangement.

Referring to the drawings somewhat more in detail, the breast box in FIG. 1 has a front wall 1 from which extends an upper wall or lip member 2 that converges with the moving porous member 7 in the direction of movement of the latter. The breast box also comprises a rear wall 3 and a bottom wall 5. Side walls depending from upper wall 2 define the lateral width of a breast box nozzle that opens to the top of the machine wire. A supply conduit 4 is connected with rear wall 3 for the supply of suspension to the breast box. Bottom wall 5 extends forwardly above the moving porous member, or wire, 7, and has an angularly downwardly inclined lip portion 8 at the front end thereof that has a small clearance from member 7, as will be seen at 6 in FIG. 2.

Porous member 7 passes around breast roll 14 and is supported on guiding idler rollers 15 engaging the return reach of the porous member. The porous member passes over suction boxes 13 which draw liquid from the suspension supplied to the porous member within the formation zone which is that region along the porous member in front of the forward edge of lip portion 8 up to the extreme front edge of upper wall or lip 2.

Within the space beneath bottom wall 5 of the breast box and the upper surface of porous member 7, there are arranged cross bars or cross members 10 and 10', more preferably of rubber or rubber-like material, which are attached to bottom wall 5 and which preferably incline therefrom in the direction of movement of porous member 7, as indicated by arrow 50. Porous member 7 along the region where cross bars 10 and 10' are located, is supported on a flat stationary support table member 12.

The cross bars 10 and 10' form with each other and with lip portion 8, the chambers 11 and 11'. At the lower edge of cross bar 10, as shown in FIG. 2, there is a small slit or gate 6', whereas the first encountered cross bar or cross member 10' bears fairly lightly on top of moving member 7, as indicated at 9'. Ports 17 for chamber 11, and 17' for chamber 11', supply the chambers with water. Advantageously, fresh water is supplied to chamber 11', while chamber 11 is supplied with fiber-containing back water. By supplying fiber-containing back water to chamber 11, the minimum disturbance of the quality of the stock in the breast box is encountered by the seeping in of the blocking medium through slit 6 into the formation zone of the paper machine.

FIG. 3a shows how a longitudinal wall of the breast box can be sealed to the moving porous member 7. In FIG. 3a, lateral wall 18 extends toward but terminates short of porous member 7 and forms therewith a gate or slit 16. Lateral wall 18 carries a member 19 forming with the said wall a chamber 21. The chamber 21 is sealed toward the outside by a sealing member 22 which bears lightly on top of porous member 7. The blocking medium is supplied to chamber 21 via a passage 20. As before, the blocking medium could be fresh water or back water, or could be another fluid such as air under pressure. Beneath porous member 7 is a suction box designated 23, and having a porous plate-like top wall 24 along which porous member 7 slides and which top wall is provided with apertures 25 through which the suction in the box is applied to the moving porous member 7.

In FIG. 3b, the same side wall 18 extends toward but terminates short of the moving porous member 7 and defines therewith a gate or slit 26.

Wall means 27, connected with top wall 24 of the suction box beneath member 7 and the side wall 18, defines a chamber 31 to which the blocking medium under pressure is supplied by way of the connection at 20. The marginal edge of the moving porous member 7 extends into chamber 31. The blocking medium, in the construction of FIG. 3b, not only seals the gate or slit 26, but also seals beneath the porous member at 26'. The seal in FIG. 3b involves absolutely no elements rubbing on the moving porous member and seals not only above the porous member but also on the bottom thereof.

In FIG. 4 is shown a modification in which a breast box of special construction is employed. The breast box in FIG. 4 comprises a tubular distributor 29 mounted inside a supporting framework 28. Tubes 30 lead from distributor 29 into a vortex chamber 33 located within a housing 32 which is sealed by spring urged sealing strip 34 to support structure 28. Chamber 33 has an outlet, or nozzle, 35 that communicates with the covered formation zone 37. Housing 33 may be fixed to a support member 38.

The moving porous member, again indicated by reference numeral 7, passes in the direction of arrow 51 about breast roll 39, a roll 40, and guide rollers 42, and has positioned therebeneath along formation zone 37, suction boxes 43. In advance of the point where outlet 35 communicates with formation zone 37, there is a pressure chamber 41 arranged beneath member 7.

Pressure chamber 41 has a top wall portion 44 that supports member 7 during its travel from breast roll 39 into formation zone 37. Member 7 moves in the direction of arrow 51, and before any part of member 7 can enter the formation zone 37, a blocking fluid medium is conveyed from chamber 41 via passage means indicated at 47, to the underside of member 7. This fluid medium, for example water, passes upwardly through the porous member and then flows in opposite directions, with one part passing toward formation zone 37 and the other part flowing out toward the left in FIG. 1. It will be evident that the position of passage means 47 could be adjusted to insure that the minimum of fluid entered the formation zone and was in such a small amount as not to interfere with the quality of the paper web being formed.

The FIG. 4 arrangement has the particular advantage of continuously cleaning the porous member 7 by dislodging any fibers from the meshes thereof that may have become lodged therein during the previous pass of the porous member through the formation zone.

It will be understood that this invention is susceptible to modification in order to adapt it to different usages and conditions and, accordingly, it is desired to comprehend such modifications within this invention as may fall within the scope of the appended claims.

What is claimed is:

1. In a papermaking machine having a wire to which a fibrous suspension is supplied and on which a web is formed, a breast box above the wire having a nozzle through which suspension flows from the breast box to the top of the wire, a porous plate engaging the bottom of the wire beneath the nozzle, said nozzle comprising a pair of longitudinal walls extending in the direction of movement of the wire and spaced laterally of the machine and disposed inwardly from the side edges of said wire, said walls defining therebetween the lateral width of said nozzle, said walls having lower edges parallel to and spaced from said porous plate so as to leave slit-like openings between the lower edges of said walls and the said porous plate, the side edges of said wire extending into said slit-like openings, and means for supplying sealing fluid to each said slit-like opening from the side thereof facing away from th nozzle space between said walls to seal the respective slit-like openings against flow of suspension from the nozzle space laterally outwardly through said slit-like openings.

2. A papermaking machine according to claim 1 in which said means for supplying sealing fluid to each said slit-like opening comprises chamber means extending along the side of the respective said wall on the side thereof facing away from the nozzle space and in communication with the respective said slit-like opening, and pipe means connected to said chamber means for suppling said sealing fluid under pressure to said chamber means.

3. A papermaking machine according to claim 2 in which each said chamber means extends from the respective said wall downwardly past the adjacent side edge of said wire to said porous plate whereby said sealing fluid is supplied to the entire edge region of said wire at each side edge thereof at said slit-like openings so as to seal between the wire and each said wall and also between the wire and said porous plate.

4. A papermaking machine according to claim 2 in which said chamber means comprises at least two serially arranged chambers, and a flexible sealing strip disposed between said chambers and engaging the top of said wire.

5. A papermaking machine according to claim 2 in which said chamber mean comprises an outer confining wall portion parallel to the respective longitudinal wall and extending downwardly into engagement with the top to said wire.

References Cited

UNITED STATES PATENTS 1,277,212   8/1918   Gustafson   162—353

FOREIGN PATENTS 478,858   11/1951   Canada   162—331

REUBEN FRIEDMAN, Primary Examiner

T. A. GRANGER, Assistant Examiner

U.S. Cl. X.R.

162—336